3,592,823
N,N'-DIGLYCIDYL COMPOUNDS
Daniel Porret, Binningen, Switzerland, assignor to
Ciba Limited, Basel, Switzerland
No Drawing. Continuation-in-part of abandoned application Ser. No. 691,217, Dec. 18, 1967. This application July 18, 1969, Ser. No. 843,215
Claims priority, application Switzerland, Dec. 27, 1967, 18,617/66
Int. Cl. C07d 49/32
U.S. Cl. 260—309.5      2 Claims

ABSTRACT OF THE DISCLOSURE

Monomeric, crystalline N,N'-diglycidyl compounds of the formula

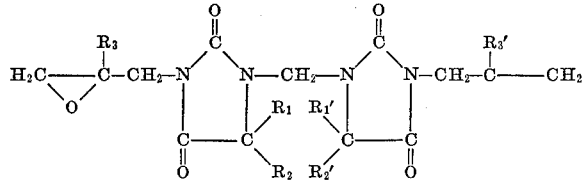

in which $R_1$, $R_1'$, $R_2$ and $R_2'$ each represents a hydrogen atom or a methyl or ethyl group and $R_3$ and $R_3'$ each represents a hydrogen atom or a methyl group.

CROSS-REFERENCES TO RELATED APPLICATIONS

This application is a continuation-in-part of our application Ser. No. 691,217, filed Dec. 18, 1967, now abandoned.

The present invention provides monomeric, crystalline N,N'-diglycidyl-bis-hydantoinyl compounds of the formula (I)

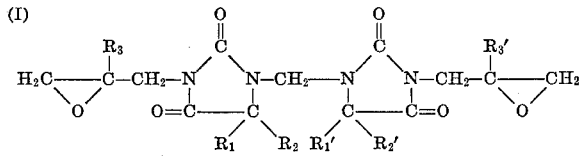

in which $R_1$, $R_1'$, $R_2$ and $R_2'$ independently of one another each represents a hydrogen atom or methyl or ethyl group and $R_3$ and $R_3'$ each represents a hydrogen atom or a methyl group.

The monomeric, crystalline diepoxides are manufactured by known methods, preferably by converting in a compound of the formula (II)

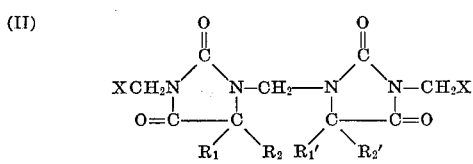

in which $R_1$, $R_1'$, $R_2$ and $R_2'$ have the above meanings, and the residues X are residues convertible into 1,2-epoxyethyl groups, the residues X into epoxyethyl groups.

The residue X convertible into the 1,2-epoxyethyl group is in particular a hydroxy-halogenethyl residue, especially a 2-halogeno-1-hydroxyethyl group or a 2-halogeno-1-hydroxy-1-methylethyl group, that carries the functional groups on different carbon atoms. Halogen atoms are especially chlorine or bromine atoms. The reaction is carried out in the usual manner, especially in the presence of dehydrohalogenating agents such as a strong alkali, for example anhydrous sodium hydroxide or aqueous sodium hydroxide solution. Alternatively, other strongly alkaline reagents, such as potassium hydroxide, barium hydroxide, calcium hydroxide, sodium carbonate or potassium carbonate, may be used.

Another residue X convertible into the 1,2-epoxyethyl group is, for example the ethenyl residue which can be so converted in known manner, especially by reaction with hydrogen peroxide or with a peracid, for example peracetic, perbenzoic or monoperphthalic acid.

The starting materials of the Formula II are obtained in known manner. Thus, for example, a bis-hydantoin of the formula (III)

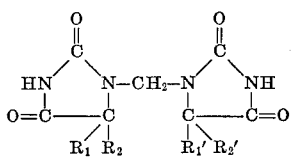

(in which $R_1$, $R_1'$, $R_2$ and $R_2'$ have the above meanings) may be reacted with a compound of the formula X-CH$_2$-Hal, where Hal represents a halogen atom and X has the meaning defined above. Preferably, the compound of the Formula III is reacted with an epihalohydrin or β-methyl-epihalohydrin, especially epichlorohydrin or β-methyl-epichlorohydrin, in the presence of a catalyst, especially a tertiary amine, a quaternary ammonium base or a quaternary ammonium salt.

Catalysts specially suitable for the addition of epichlorohydrin or β-methyl-epichlorohydrin are tertiary amines, such as triethylamine, tri-n-propylamine, benzyldimethylamine, N,N'-di-methylaniline and triethanolamine; quaternary ammonium bases such as benzyltrimethyl ammonium hydroxide; quaternary ammonium salts such as tetramethyl ammonium chloride, benzyl trimethyl ammonium chloride, benzyl trimethyl ammonium acetate, methyl triethyl ammonium chloride; hydrazines containing a tertiary nitrogen atom such as 1,1-dimethylhydrazine, which may also be used in the quaternated form; furthermore ion exchange resins containing tertiary or quaternary amino group, or ion exchange resins containing acid amide groups. A catalytic action is also developed by basic impurities such as may be present in commercial forms of the starting compounds III. In such a case it is not necessary to add any catalyst.

The invention includes also any variant of the present process in which an intermediate obtained at any stage thereof is used as starting material and the remaining steps are carried out, or a starting material is formed in situ or is further reacted as it is obtained.

According to a preferred variant of the process, for example, an epihalohydrin or β-methylepihalohydrin, preferably epichlorohydrin or β - methyl - epichlorohydrin, is reacted with a comopund of the Formula III in the presence of a catalyst, preferably of a tertiary amine or quaternary ammonium base or quaternary ammonium salt, and in a second stage the resulting product containing halohydrin groups is treated with a dehydrohalogenating agent. These reactions are carried out in the manner described above, using as catalyst for the additive reaction with epihalohydrin or β-methyl-epihalohydrin and/or for the dehydrohalogenation one of the compounds referred to above. This variant gives specially good yields when an excess of epichlorohydrin or β-methyl-epichlorohydrin is used. During the first reaction, prior to the addition of the alkali, a partial epoxidation of the dichlorohydrin or the dichloro-β-methylhydrin of hydantoin already takes place. Epichlorohydrin or β-methyl-epichlorohydrin which act as a hydrogen chloride acceptor, have then been partially converted into glycerol dichlorohydrin or β-methylglycerol dichlorohydrin.

The starting materials of the Formula III are readily accessible by condensing 2 mols of a hydantoin of the formula (IV)

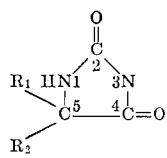

with 1 mol of formaldehyde.

As hydantoins of the Formula IV there may be mentioned, for example: hydantoin, 5-methylhydantoin, 5,5-diethylhydantoin, 5-methyl - 5 - ethylhydantoin and especially 5,5-dimethylhydantoin.

A preferred starting material of the Formula III is bis-(5,5-dimethylhydantoinyl-1)-methane which is accessible by condensing 2 mols of 5,5-dimethylhydantoin with 1 mol of formaldehyde.

The present process furnishes a high yield of about 90% of crystalline N,N'-diglycidyl-bis(5,5-dimethyl-hydantoinyl-1) methane.

The diepoxides (I) of this invention react with the usual curing agents for epoxy compounds. They can, therefore, be crosslinked or cured by the addition of such curing agents, just like other polyfunctional epoxy compounds. As such curing agents there are suitable basic or acidic compounds. The following have proved suitable:

Amines or amides, such as aliphatic or aromatic primary, secondary and tertiary amines, for example m-phenylenediamine, p - phenylenediamine, bis(p - aminophenyl)methane, ethylenediamine, hexamethylenediamine, trimethylhexamethylenediamine, N,N - diethylethylenediamine, diethylenetriamine, tetra(hydroxyethyl) diethylenetriamine, triethylenetetramine, N,N-dimethylpropylenediamine, bis(4-aminocyclohexyl)dimethylmethane, 3,5,5-trimethyl - 3 - (aminomethyl)cyclohexylamine, Mannich's bases such as 2,4,6-tris(dimethylaminomethyl)phenol; dicyandiamide, melamine, cyanuric acid; urea-formaldehyde and melamine-formaldehyde resins; polyamides, for example those from aliphatic polyamines and dimerised or trimerised unsaturated fatty acids; polyhydric phenols, for example resorcinol, bis(4-hydroxyphenyl) dimethylmethane, phenol-formaldehyde resins; reaction products of aluminium alcoholates or phenolates with compounds of tautomeric reaction of the acetoacetic acid ester type; Friedel-Crafts catalysts, for example $AlCl_3$, $SbCl_4$, $ZnCl_2$, $BF_3$ and their complexes with organic compounds, for example $BF_3$-amine complexes; metal fluoroborates such as zinc fluoroborate; phosphoric acid; boroxines such as trimethoxyboroxine; polybasic carboxylic acids and their anhydrides, for example those of the following acids: phthalic, tetrahydrophthalic, hexahydrophthalic, methylhexahydrophthalic, 3,6-endomethylene-tetrahydrophthalic, methyl-3,6-endomethylene - tetrahydrophthalic (=methyl nadic anhydride(, 3,4,5,6,7,7-hexachloro - 3,6 - endomethylene-tetrahydrophthalic, succinic, adipic, maleic, azelaic, allylsuccinic, dodecenylsuccinic acid; 7-allyl-bicyclo(2.2.1)hept - 5 - ene - 2,3 - dicarboxylic acid anhydride, pyromelitic dianhydride or mixtures of such anhydrides.

If desired, there may be additionally used during the anhydride curing an accelerator, such as a tertiary amine or a salt or quaternary ammonium compound, for example 2,4,6 - tris(dimethylaminomethyl)phenol, benzyldimethylamine or benzyldimethyl ammonium phenolate, tin(II) salts of carboxylic acids such as tin(II)octoate or an alkali metal alcoholate, for example sodium hexylate.

For curing the polyepoxides of this invention with anhydrides it is advantageous to use for every gram equivalent of epoxide groups 0.5 to 1.1 gram equivalents of anhydride groups.

The term "curing" as used in this context means the conversion of the above diepoxides into insoluble and infusible, crosslinked products, as a rule accompanied by shaping to furnish shaped articles such as castings, mouldings or laminates, or flat structures such as coatings, lacquer films or adhesive bonds.

Furthermore, the diepoxides of this invention may be used in admixture with other curable diepoxy or polyepoxy compounds, for example with polyglycidyl ethers of polyhydric alcohols or especially of polyhydric phenols, such as resorcinol, bis(4 - hydroxyphenyl)dimethylmethane (=bisphenol A), bis(4 - hydroxyphenyl)sulphone or condensation products of formaldehyde with phenols (novolaks); polyglycidyl esters of polycarboxylic acids, for example phthalic acid diglycidyl ester or hexahydrophthalic acid diglycidyl ester; triglycidyl isocyanurate; aminopolyepoxides as are obtained by dehydrohalogenating reaction products of epihalohydrin and primary or secondary amines such as aniline or 4,4'-diaminodiphenylmethane, and also alicyclic compounds containing several epoxide groups, such as vinylcyclohexene diepoxide,
dicyclopentadiene diepoxide,
ethyleneglycol-bis(3,4-epoxy-tetrahydro-dicyclopentadien-8-yl)-ether,
3,4-epoxy-tetrahydro-dicyclopentadienyl-8-glycidyl ether,
3',4'-epoxy-cyclohexylmethyl)-3,4-epoxy-cyclohexane carboxylate,
(3',4'-epoxy-6'-methylcyclohexylmethyl)-3,4-epoxy-6-methylcyclohexane carboxylate,
bis(cyclopentyl)ether diepoxide or
3-(3',4'-epoxycyclohexyl)2,4-dioxaspiro(5.5)-9,10-epoxyundecane.

Accordingly, the present invention includes also curable mixtures suitable for the manufacture of shaped articles, including flat structures, containing the diepoxides of this invention, if desired in admixture with other diepoxy or polyepoxy compounds and also curing agents for epoxy resins, such as polyamines or anhydrides of polycarboxylic acids.

The diepoxy compounds of this invention, or their mixtures with other polyepoxy compounds and/or curing agents, may be admixed at any stage prior to curing with extenders, fillers and reinforcing agents, plasticizers, pigments, dyestuffs, flame-inhibitors and mould release agents.

Suitable extenders, fillers and reinforcing agents are, for example, asphalt, bitumen, glass fibres, boron fibres, carbon fibres, cellulose, mica, quartz meal, hydrated alumina, gypsum, kaolin, ground dolomite, colloidal silica having a large specific surface (Aerosil) or metal powders such as aluminium powder.

The curable mixtures may be used in the unfilled or filled state, if desired in the form of solutions or emulsions, as laminating resins, paints, lacquers, dipping, impregnating or casting resins, moulding compositions, sinter powders, caulking and sealing compositions, pore fillers, floorings, potting and insulating compounds for the electrical industry, as adhesives, or for the manufacture of such products.

Parts and percentages in the following examples are by weight. Temperatures are shown in degrees centigrade.

EXAMPLE 1

A mixture of 268 g. (1 mol) of bis(5,5-dimethylhydantoinyl-1)-methane, 2775 g. (30 mols) of epichlorohydrin and 1.5 g. of benzyl trimethyl ammonium chloride was heated to the boil at 110° C. The epichlorohydrin formed an adduct with the NH groups, at first forming N-chlorohydrin groups and then N-glycidyl groups, and excess epichlorohydrin was converted into glycero dichlorohydrin ("trans-epoxidation"). The formation of N-glycidyl groups during the reaction was checked by titration of specimens from which unreacted epichlorohydrin and the dichlorohydrin formed by the trans-epoxidation had been removed by distillation. After ¾ hour the resin contained 2.3 epoxide equivalents per kg. and after 4½ hours 3.8 epoxide equivalents per kg.; the latter value corresponds to the trans-epoxidation equilibrium. The reaction mixture was cooled to 60° C. and 91 g. of solid sodium hydroxide (of 97% purity) were then added portionwise within 35 minutes, while maintaining the temperature at 60° C. by slight cooling. When the sodium hydroxide addition was complete, the batch was stirred on for 30 minutes at 60° C. and then concentrated under a vacuum of 35 mm. Hg until the whole water of reaction had been removed azeotropically. The sodium chloride formed was then filtered off and washed with a small quantity of epichlorohydrin and the reaction product was further concentrated, at first under a vacuum of 30 mm. Hg to recover the excess dichlorohydrin and finally under a high vacuum.

There were obtained 363 g. of a faintly yellowish, solid, crystalline mass which was powdered and freed from the last traces of epichlorohydrin on a metal tray at 50° C. in a vacuum drying cabinet, to leave 353 g. (=92% of theory) of a faintly yellowish, crystalline resin which contained 5.15 epoxide equivalents per kg. and 0.7% of chlorine. Recrystallization of 50 g. of this product from 325 g. of methanol furnished 45 g. of very pure N,N'-diglycidyl-bis(5,5 - dimethyl - hydantoinyl-1)-methane which melted at 147° C. and of which only 0.6% dissolved in water.

*Analysis.*—Calculated (percent): epoxide equivalents/kg., 5.26; C, 53.67; H, 6.36; N, 14.73. Found (percent): epoxide equivalents/kg., 5.25; C, 53.76; H, 6.34; N, 14.45.

EXAMPLE 2

The experiment described in Example 1 was repeated in identical manner, except that only 15 mols instead of 30 mols of epichlorohydrin were added. When the trans-epoxidation equilibrium was reached, a specimen of the resin, from which epichlorohydrin and glycerol dichlorohydrin had been distilled off, contained 3.41 instead of 3.8 epoxide equivalents per kg. as described in Example 1.

The addition of sodium hydroxide and the working up of the reaction mixture were carried out exactly as in Example 1. Yield: 368 g. of a faintly yellowish, crystalline substance (=96% of theory). The product contained 5.16 epoxide equivalents per kg. This result proves that when the reaction is carried out with 15 mols of epichlorohydrin instead of with 30 mols as in Example 1, a practically equally good yield is obtained.

EXAMPLE 3

A mixture of 9.8 g. of bis(5-methyl-5-ethyl-hydantoinyl-1) methane, 92 g. of epichlorohydrin and 0.05 g. of benzyl trimethylammonium chlorde was heated to the boil. After 2 hours, a specimen of the resin, from which the volatile constituents had been removed by distillation, contained 3.5 epoxide equivalents per kg. The reaction mixture was then mixed with 3 g. of solid sodium hydroxide of 95% purity and worked up as described in Example 1, to furnish 11.5 g. of a yellow, crystalline product which, after crystallization from methanol, yielded pure N,N'-diglycidyl-bis(5-methyl-5-ethyl-hydantoinyl-1)methane which contained 4.8 epoxide equivalents per kg. (theory: 4.85) and melted at 134° C.

EXAMPLE 4

A mixture of 268 g. of bis(5,5-dimethylhydantoinyl-1)-methane (1.0 mol), 3195 g. of β-methylepichlorohydrin (30 mols) and 1 g. of tetramethylammonium chloride were heated to boiling. After 3½ hours the solution was cooled to 60° C. and 98.9 g. of 97% strength sodium hydroxide (2.4 mols) were added in portions over the course of 20 minutes. After a further 30 minutes the water of reaction was distilled off azeotropically. The reaction mixture was then treated with 50 g. of Fuller's earth and 50 g. of active charcoal, cooled to 20° C. and filtered. The clear filtrate was concentrated on a rotational evaporator and finally freed of the last volatile constituents in a high vacuum. 407 g. (99.5% of theory) of a yellowish crystalline substance were obtained, which contained 4.78 epoxide equivalents/kg. (theory 4.89). After recrystallisation from methane the pure bis(3-β-methylglycidyl-5,5-dimethylhydantoinyl-1)methane melted at 118.2°–120.3° C.

EXAMPLE 5

100 parts of the N,N'-diglycidyl-bishydantoinyl compound described in Example 1, which is solid at room temperature and contains 5.15 epoxide equivalents per kg., were melted at 170° C. 65 parts of phthalic anhydride were dissolved in this melt, during which the temperature drops to 130° C. Part of this mixture is used to make a casting measuring 120 x 10 x 8 mm. and cured for 14 hours at 140° C. The casting has a heat distortion point according to Martens (DIN) of 125° C.

Another portion of the above mixture is poured over a metal tray to form a layer about 5 mm. thick, allowed to solidify and then powdered. The one-component system obtained in this manner is used to make adhesive bonds, using ground and degreased aluminium strips (170 x 25 x 1.5 mm.; 10 mm. overlap) marketed under the registered trademark "Antikorrodal B." The tests were carried out at room temperature and the bonded strips then cured for 14 hours at 140° C.

The specimens cured in this manner display a shear strength of 1.2 to 1.4 kiloponds/mm.$^2$ measured at room temperature, while at 125° C. a shear strength from 1.4 to 1.8 kiloponds/mm.$^2$ is achieved.

EXAMPLE 6

100 parts of the N,N'-diglycidyl-bishydantoinyl compound described in Example 1, containing 5.15 epoxide equivalents per kg., are mixed at room temperature with 14 parts of dicyandiamide and the whole is finely comminuted and mixed in a mortar. One part of the resulting one-component system is used to make adhesive bonds as described in Example 5 and the specimens are cured for 14 hours at 140° C.

The shear strength, measured at room temperature, amounts to 0.9 to 1.2 kiloponds/mm.$^2$.

Another portion of the mixture is powder-sprayed over an iron sheet (70 x 150 x 0.8 mm.) previously heated at 180° C. and then cured for 14 hours at 140° C.; the resulting homogeneous film is distinguished by its extraordinary hardness.

EXAMPLE 7

A mixture of:

328 g. of N,N'-diglycidyl-bis(5,5-dimethyl-hydantoinyl-1) methane, containing 5.06 epoxide equivalents per kg. (85% solution in acetone)
72 g. of 4,4'-diaminodiphenylmethane
638 g. of burnt kaolin (registered trademark "Molochit")
10 g. of calcium stearate and
2 g. of channel black was kneaded for 15 minutes in a divided-trough kneader until a homogeneous dough was obtained which was then stored for 6 hours at 40–50° C. in a vacuum cabinet to remove the acetone and to convert the mass into a state suitable for grinding. After cooling, the dry material was comminuted in a hammer mill.

The moulding composition obtained in this manner was moulded at 165° C. and revealed the following properties:

Heat distortion point according to Martens (DIN) 53 458)—116° C.
Flexural strength (VSM 77 103), kg./mm.$^2$—7.1
Impact strength (VSM 77 105), cm. kg./cm.$^2$—1.8
Loss factor Tgδ at 20° C. (VDE 0303) at 50 cycles/second—0.014
Dielectric constant ε at 20° C. (VDE 0303), 50 cycles/second—5.4

Ohmic resistance, dry (VDE 0303) [ohm×cm.]—6.1 x $10^{15}$

Ohmic resistance after 24 hours' immersion in water at 20° C. (VDE 0303) [ohm×cm.]—1.3 x $10^{15}$ Surface resistance, dry (VDE 0303) [ohm]—5.5 x $10^{13}$ Tracking resistance (DIN 53 480) [stage]—KA3c.

EXAMPLE 8

A mixture of:

317 g. of N,N'-diglycidyl-bis(5,5-dimethyl-hydantoinyl-1) methane containing 5.1 epoxide equivalents per kg. (84% solution in acetone)

83 g. of 2,2-bis(4'-aminocyclohexyl)propane 638 g. of burnt kaolin (registered trademark "Molochit")

10 g. of calcium stearate and 2 g. of phthalocyanine blue was kneaded for 15 minutes in a divided-trough kneader until a homogeneous dough was obtained which was then stored for 6 hours at 40–50° C. in a vacuum cabinet to remove the acetone and to convert the mass into a state suitable for grinding. After cooling, the dry material was comminuted in a hammer mill.

The moulding composition obtained in this manner was moulded at 165° C. and revealed the following properties:

Heat distortion point according to Martens (DIN 53 458)—100° C.

Loss factor Tgδ at 20° C. (VDE 0303), 50 cycles/second—0.016

Dielectric constant ε at 20° C. (VDE 0303) 50 cycles/second—5.2

Ohmic resistance, dry (VDE 0303) [ohm×cm.]—3.1 x $10^{15}$

Ohmic resistance after 24 hours' immersion in water at 20° C. (VDE 0303) [ohm×cm.]—7.7 x $10^{14}$ Surface resistance, dry (VDE 0303) [ohm]—6.5 x $10^{13}$ Tracking resistance (DIN 53 480) [stage]—KA3c.

What is claimed is:

1. A N,N'-diglycidyl compound of the formula

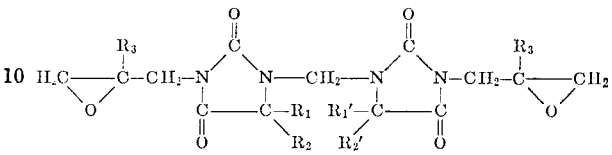

in which $R_1$, $R_1'$, $R_2$ and $R_2'$ each represents a member selected from the group consisting of hydrogen atom, methyl group and ethyl group and $R_3$ and $R_3'$ each is methyl.

2. A compound as claimed in claim 1, which is N,N'-di-(3-β-methylglycidyl)-bis-(5,5 - dimethylhydantoinyl-1) methane.

References Cited

UNITED STATES PATENTS 3,391,097  7/1968  Williamson _____ 260—309.5
3,493,582  2/1970  Hoffer _____ 260—309

OTHER REFERENCES

Netherlands application 6606853, November 1966, 260–309.

NATALIE TROUSOF, Primary Examiner

U.S. Cl. X.R.

260—2, 47, 57, 67.6, 70, 78.4